Jan. 18, 1927.
C. D. SYMMES
1,614,700
VEGETABLE THINNING MACHINE
Filed March 9, 1925 2 Sheets-Sheet 1
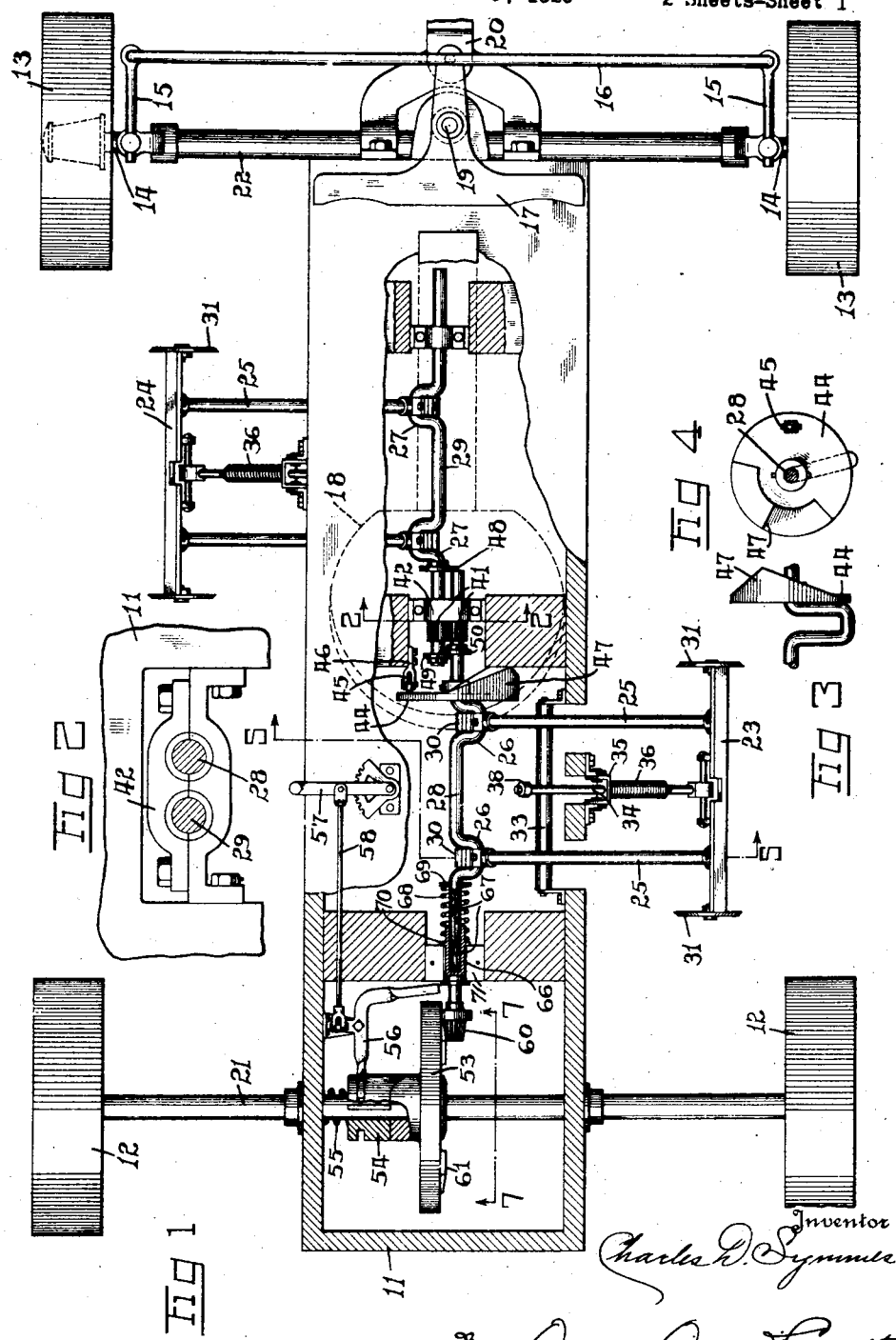
Inventor
Charles D. Symmes
By Owen, Owen & Crampton
Attorney

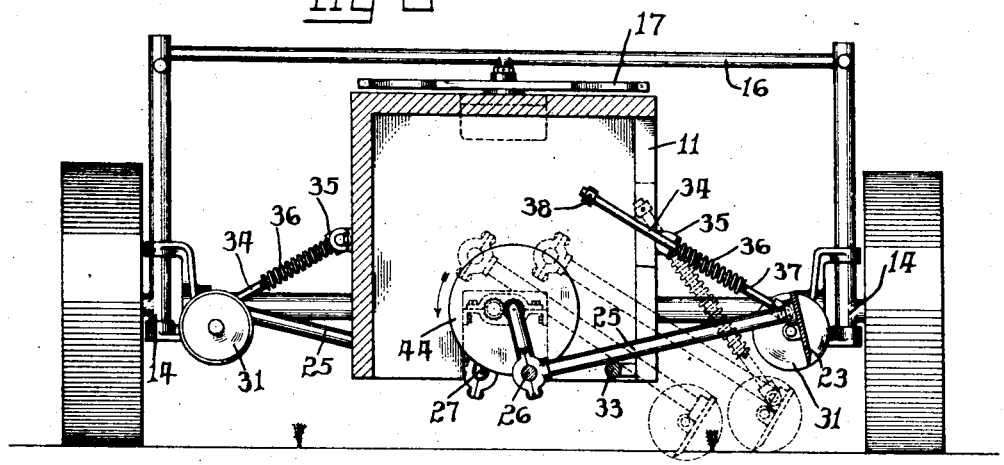
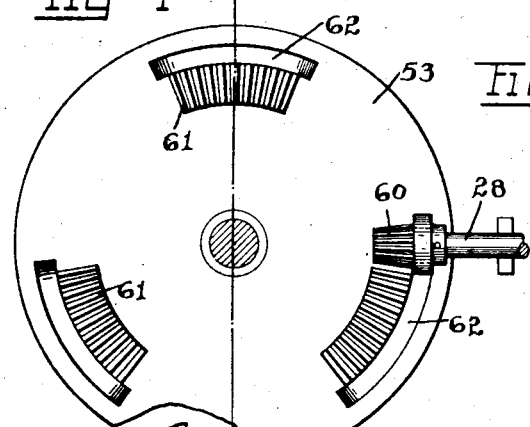
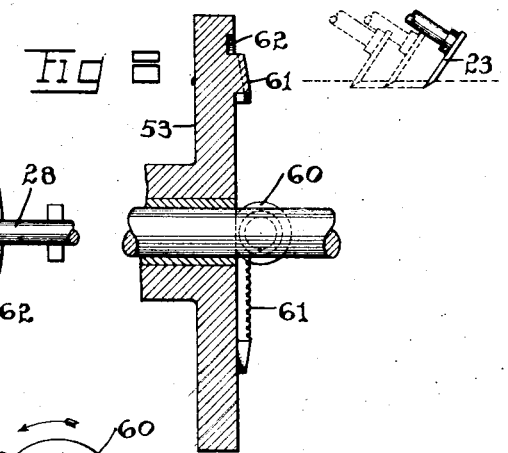
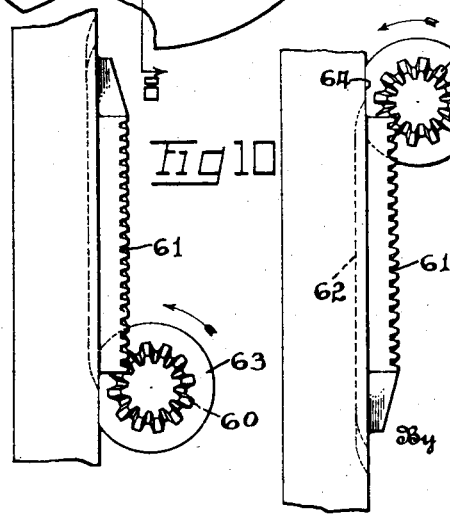
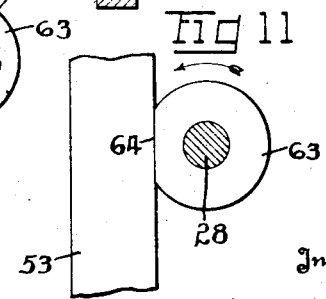

Patented Jan. 18, 1927.

1,614,700

UNITED STATES PATENT OFFICE.

CHARLES D. SYMMES, OF CYGNET, OHIO.

VEGETABLE-THINNING MACHINE.

Application filed March 9, 1925. Serial No. 13,945.

My invention has for its object to provide a vegetable thinning machine whereby portions of rows of vegetation of any kind may be removed leaving plants located in uniformly spaced relation to each other in parallel cross rows. The invention particularly has for its object to secure a number of advantages in agricultural thinning operations. Thus an object of the invention is to prevent a haphazard stroke extending diagonally to the direction of movement of the machine along the rows. A further object is to provide means for producing a uniform depth of stroke across the rows of vegetation whereby a considerable latitude may be given the position of the machine relative to the rows, and yet the required depth of the cut will be assured so that all the vegetation within the length of the stroke will be removed. A further object is to provide an efficient means for controlling the position of the machine relative to the rows. The invention also has for its object other advantages and features that appear from the following description and upon examination of the drawings.

The invention may be contained in structures that differ in their forms and in their details and to illustrate a practical application of the invention I have selected one of such structures as an example of structures containing my invention and shall describe it hereinafter. The structure selected for purposes of illustration is shown in the accompanying drawings.

Figure 1 of the drawings illustrates a top view of the machine, a part being shown in section and broken away to more clearly illustrate parts of the mechanism. Fig. 2 is a view of a section taken on the plane of the line 2—2 indicated in Fig. 1. Fig. 3 illustrates a part of a cam for shifting the hoes in a direction reverse to that of the movement of the machine. Fig. 4 illustrates a face view of the cam shown in Fig. 3. Fig. 5 is a view of a section taken on the plane of the line 5—5 indicated in Fig. 1. Fig. 6 illustrates the stroke of the hoes. Fig. 7 illustrates a mutilated gear for controlling the operation of the hoes and is a view of a section taken on the plane of the line 7—7 indicated in Fig. 1. Fig. 8 is a view of a section taken on the plane of the line 8—8 indicated in Fig. 7. Fig. 9 illustrates one position of the pinion relative to the mutilated gear shown in Fig. 7. Fig. 10 illustrates a second position of the pinion. Fig. 11 illustrates a third position of the pinion shaft.

Vegetable thinning machines commonly known in art are mounted on a conveyance either drawn or driven and devices are provided for removing portions of the vegetation from the rows thereby destroying and preventing further growth of the removed vegetation. In the form of construction shown the machine 11 is drawn by any suitable means such as by horses or by a tractor that may be connected to the hitch 20, the machine being provided with the wheels 12 and 13. The wheels 13 are supported on stub axles 14 to which are connected the steering arms 15. The steering arms are connected to the steering link 16 and the bell crank steering lever 17 is connected to the steering link 16. The bell crank lever 17 forms a double pedal located on the top of the machine 11 and in such a position that when one is seated in the seat 18 the pedal 17 may be operated so as to swing it on its pivot pin 19 and move the wheels 13 about the axes of the stub axles 14 to maintain the machine 11 in its proper relation with respect to the rows of vegetation.

The wheels 12 and 13 are located on axles 21 and 22 that are of sufficient length so that they will extend across or over two rows of vegetation, the machine being so constructed as to operate on the two rows as the machine is drawn or driven along the rows. The machine is provided with a pair of hoes 23 and 24 that are located on opposite sides of the machine. The hoes 23 and 24 have arms 25 that are connected to the cranks 26 and 27 of the shafts 28 and 29 by suitable bearing parts, such as the bearings 30 whereby the hoes 23 and 24 will reciprocate back and forth, means being provided for lifting the hoes during the outward strokes and lowering the hoes during their return stroke. Preferably the outward strokes or movements of the hoes are made at the same time, the inward strokes being practically a continuation of the movements of the hoes though in a reverse direction.

In order that the hoes may be raised in their outward stroke, rollers 33 are located between the hoes 23 and 24 and the cranks 26 and 27, so that the upper surfaces of the rollers will lie in a horizontal plane slightly above the ends of the cranks. When, therefore, the cranks 26 and 27 pass below the axes of their associated shafts towards the rollers, the arms 25 will roll on the rollers and their outer ends will be pushed outward and tilted up so as to raise the hoes from the ground. As the cranks move upward on the rollers' sides of the axes of the shafts, the hoes are lowered and as the cranks move away from the rollers along the top of the top portions of the circles described by the cranks, the hoes dig into the ground and draw it towards the central vertical plane extending through the major axis of the machine, until the arms 25 again strike the rollers 33 whereupon the hoes will again be raised and moved outward. In order to control the hoes and prevent their being drawn upward to a material degree so that the arms 25 will be thrown away from the rollers 33, the rods 34 are connected to the hoes 23 and 24. The rods 34 slide through pivoted stirrups 35 and compression springs 36 are located in the rods 34 between the stirrups 35 and pins 37 whereby the hoes 23 and 24 are pushed outward and held under pressure by the compression springs 36 that have an expansibility sufficient to press the hoes outward and downward until the completion of their inward strokes, such movement under the influence of the springs 36 being limited by the adjustable rings 38 located on the ends of the rods 34 that may come into contact with the stirrups 35. Thus the rods 34 together with the arms 25, as controlled by the rollers 33 and the cranks 26 and 27, produce a substantially uniform depth of stroke of the lower edges of the hoes 23 and 24 as indicated in Fig. 6. In order that the hoes 23 and 24 may make substantially the same right and left stroke at the same time the shafts 28 and 29 are connected together by the gear wheels 41 located on the overlapping ends of the shafts that have the common bearing in the bearing part 42. Also the hoes 23 and 24, together with their associated parts, namely the arms 25 and the cranks 28 and 29, are held stationary with respect to the ground, that is, moved rearwardly with respect to the machine during the thinning stroke, namely, during the times of the contact of the hoes with the ground. This is accomplished by means of the cam 44 that is connected to one of the shafts such as the shaft 28 and a roller 45 that is pivotally connected to a bracket 46 which is secured to a part of the frame of the machine. The cam 44 has a raised portion 47 that engages the roller 45 and forces the cam 44 and its shaft 28 along the axis of the shaft which carries the hoe 23 in a rearward direction relative to the machine, but maintains the hoe 23 in a stationary position as to any linear movement along the edge of the hoe and thus causes the shaft 28 to move the hoe at right angles to the row of vegetation on which it is operating. In order to move the shaft 29 in a similar manner to cause the hoe 24 with which it is associated to strike across the row of vegetation that it is operating upon, at right angles to the direction of the row, the shafts 28 and 29 are interengaged by means of the discs 48 and 49 and 50 that are keyed to the shafts. The discs 48 and 49 are keyed to the shaft 29 while the disc 50 is keyed to the shaft 28. The disc 48 covers the end of the shaft 28 while the disc 49 engages the disc 50, that is, the discs 48 and 49 of the shaft 29 are engaged by the end of the shaft 28 and the disc 50, which is located on the shaft 28, and so that endwise movement of either of the shafts will cause the endwise movement of the other shaft.

The shafts 28 and 29 are driven by the wheels 12 operating through their axle 21 to which they are connected and the mutilated gear 53 that may be connected to the axle 21 by means of the clutch 54. The clutch 54 is a spring pressed clutch being provided with a spring 55 for closing the clutch connections between the mutilated gear 53 and the axle 21 which forms the driving shaft of the machine. The clutch 54 may be operated by a suitable lever such as the lever 56 or by the lever 57 which is connected to the lever 56 by means of the link 58. The lever 56 is bent to engage the gear 53 to prevent its rotation when the clutch is open.

A miter gear 60 is connected to the shaft 28 and through the gear wheels 41 is connected to the shaft 29. The miter gear 60 meshes with the teeth of the mutilated gear 53. The teeth of the mutilated gear form segmental arcuate racks 61. Channels 62 extend along the outer ends of the teeth of the mutilated gear 53 while the shaft 28 has a disc 63 keyed thereto in juxtaposed relation to the miter gear 60. The major portion of the disc 63 has a radius that is greater than the distances between the axis of the miter gear 60 from the face of the mutilated gear 53 on which the arcuate or segmental racks 61 are located or of which they form an integral part. The disc 63, however, has a flattened edge portion 64 that extends as a cord across a portion of the circle of the remainder of the disc and which is located at a distance from the center of the disc equal to the distance of the axis of the miter gear from the face of the mutilated gear 53 as shown in Fig. 11. Thus when the miter gear 60 first strikes the teeth of one of the segmental racks 61 and the shaft 28 is rotated, the peripheral portion of the disc 63 moves in a channel 62 located in proximity to the segmental rack that is operating upon the miter gear 60. The miter gear is given a complete rotation so that it is delivered by the rack when the disc is removed from the channel and the flattened edge portion of the disc lies parallel to the face of the mutilated gear. This operates to hold the miter gear in position until a succeeding rack of the mutilated gear comes in contact and operates upon the miter gear when the same operations take place. Thus the shafts 28 and 29 are intermittently operated while the machine is moved substantially uniformly forward and with a frequency to leave the desired number of plants standing in each hill part of the rows.

In order that the shafts 28 and 29 together with their associated hoes may be moved at right angles to the rows during the periods of the thinning stroke, the miter gear 60 is slip keyed on the end of the shaft 28. The miter gear 60 is connected to a sleeve 66, and the shaft 28 and the sleeve 66 are splined as at 67 to permit the longitudinal movement of the shaft 28 relative to the sleeve 66. In order to maintain the cam 47 against the roller 45 a spring 68 is located between the collar 69 that is secured to the shaft 28 and a flange 70 that may be formed integral with the sleeve 66 that operates to resiliently maintain the shaft 28 against the roller 45. A suitable bearing 71 is provided for the sleeve 66 which also supports the splined end of the shaft 28. Thus the spring 68 shifts the shafts 28 and 29 and the hoes 23 and 24 when the raised portion 47 of the cam passes the roller 45. In the operation of the mechanism the hoes are lifted during the outward strokes and lowered during the return stroke by the operation of the cranks 26 and 27 which cause the ends of the arms to engage the roller and as the cranks move upward on the rollers' sides of the axes of the shafts the hoes are lowered and as the cranks move away from the rollers along the top of the top portions of the circles described by the cranks, the hoes dig into the ground and draw the ground towards the central vertical plane extending through the length of the machine until the arms 25 strike the rollers 33 whereupon the hoes will be again raised and moved outward. The hoes are pushed outward and held under pressure by the compression springs 36 whereby a substantially uniform depth of stroke of the lower edges of the hoes are produced. In order that the hoes may make substantially the same right and left stroke at the same time the shafts 28 and 29 are connected together by the gear wheels 41 and the hoes and the shafts are moved rearwardly with respect to the machine during the periods that the hoes are in contact with the ground by means of the cam 44 and the roller 45 which is operated upon by the cam. This moves the hoes rearwardly relative to the machine while the hoes are being drawn across the ground and consequently they move the hoes at right angles to the direction of movement of the machine. The return movement of the hoes is performed by the operation of the spring 68 which shifts the shafts 28 and 29 when the raised portion 47 of the cam passes the roller 45.

I claim:

1. In a vegetation thinning machine, a hoe for removing portions of the rows of the vegetation, a driving shaft, a shaft for reciprocally operating the hoe and splined to the first named shaft, and a cam connected to the first named shaft for periodically shifting the second named shaft and the hoe relative to the machine during the operations of the hoe.

2. In a vegetation thinning machine, a hoe for removing portions of the rows of the vegetation, a driving shaft, a shaft for reciprocally operating the hoe and splined to the first named shaft, and a cam connected to the first named shaft for periodically shifting the second named shaft and the hoe relative to the machine during the operations of the hoe, means for moving the machine along the rows of the vegetation and a steering mechanism for guiding the machine relative to the rows of vegetation.

In testimony whereof I have hereunto signed my name to this specification.

CHARLES D. SYMMES.